July 24, 1962 RAY T. KIKOSHIMA 3,045,915

MAGNETIC CORE CIRCUITS

Filed Oct. 30, 1956 3 Sheets-Sheet 1

INVENTOR.
RAY T. KIKOSHIMA
BY John E. Dougherty, Jr.
AGENT

July 24, 1962 RAY T. KIKOSHIMA 3,045,915

MAGNETIC CORE CIRCUITS

Filed Oct. 30, 1956 3 Sheets-Sheet 2

3,045,915
MAGNETIC CORE CIRCUITS

Ray T. Kikoshima, Wappingers Falls, N.Y., assignor to International Business Machines Corporation, New York, N.Y., a corporation of New York Filed Oct. 30, 1956, Ser. No. 619,199
29 Claims. (Cl. 235—176)

The present invention is related to logical circuits which employ multi-path magnetic cores as switching elements and more particularly to circuits wherein multi-path cores are utilized to provide outputs indicative of different logical combinations of inputs which are applied at different locations on the core.

Heretofore binary logical circuits have employed electromechanical relays, electronic vacuum tubes and crystal diodes as switching components. However, recently, the realization of the advantages of solid state elements, such as magnetic cores, in that they are smaller in size and faster and more reliable over long periods of operation, have stimulated efforts to provide binary logical circuits utilizing elements of this type. The earlier magnetic core structures were operated essentially as single path magnetic circuits. More recently, as is evidenced by the copending applications Serial No. 605,603 and Serial No. 608,227 filed August 22, 1956 and September 6, 1956, respectively in behalf of Edwin Bauer and assigned to the assignee of this application, it has been demonstrated that great advantages, in economy of parts, simplicity of structure and reliability of operation, are realized when magnetic elements, having a plurality of selectively operable magnetic paths or magnetic circuits, are utilized as switching elements in logical circuits. Such cores have been constructed having one or more openings, pierced at selected positions on their circular axis, which openings divide the core material into inner and outer flux paths. Input windings are positioned through these openings which are effective, according to the manner in which they are wound and energized, to apply magnetomotive forces capable of producing flux changes either in the localized areas around the openings and in one or both of the inner and outer flux paths in portions of the core remote from the openings. The present invention is principally concerned with circuits wherein magnetomotive forces may be applied to the different flux paths in a multi-path core by selectively energizing properly positioned input windings in such a manner that the flux changes, effected in the portion of the core embraced by the output windings, are dependent not only upon the magnetomotive force applied at one location but upon the combinations of magnetomotive forces which are applied at any particular time at the different locations.

It is a principal object of the present invention to provide improved multi-path magnetic core switching elements which employ a novel mode of operation in producing the required outputs.

A further object is to provide a circuit element capable of producing outputs indicative of different logical combinations of a large number of inputs.

Another object is to provide multi-path magnetic core elements capable of producing outputs indicative of successive logical combinations of a plurality of input information signals.

The manner in which these objects are achieved is illustrated in the embodiments herein disclosed, one of which is a full binary adder circuit wherein two multi-path cores are utilized to accomplish all of the logical switching required to produce the necessary outputs. According to the rules of binary addition a full adder, which is a three input, two output device, must be capable of producing an output signal at one output terminal, usually termed the sum output terminal, only when a signal is exclusively applied to any one of the three input terminals and when signals are coincidently applied to all three input terminals. The device must also be capable of providing an output at the carry output terminal only when inputs are coincidently applied to two or more of the input terminals. In accordance with the principles of the invention a device of this nature is constructed utilizing two multi-path cores each of which is inductively associated with first, second and third separate input winding means. One of the cores, termed the sum core, is embraced with output winding means on which the sum output signals are induced, and the other, which is termed the carry core, is embraced with an output winding means on which the carry outputs are induced. The sum core includes four openings and through each of these openings at least one loop of each of the input winding means is positioned to embrace one of the flux paths at a point adjacent the opening. A bias winding is positioned through one of the openings to embrace one of the flux paths at that location. The design is such that the magnetomotive force applied by the bias winding is twice that applied by the portions of the three input winding means positioned through the same opening. Both the inner and outer flux paths are initially reset to a remanent condition in one direction. The sense of the input and bias windings is such that when any one of the input winding means is energized exclusively or when all three are energized coincidently, a localized field is established around one of the openings. This localized field is effective to cause a flux reversal in the inner flux path in the portion of the core embraced by the sum output winding. When none of the input winding means are energized, the sense of the bias winding is such that no flux reversal takes place and similarly when two of the input winding means are energized coincidently the arrangement of windings is such that net magnetomotive force applied at the location of each of the openings is either of insufficient magnitude or in a direction so as to be ineffective to produce a flux reversal in the portion of the core linked by the output winding. The single sum core is thus capable of performing the function of both a triple coincidence circuit and a three input EXCLUSIVE OR circuit and, since the flux reversals, producing the outputs when the input signals are initially applied, cause the core to assume a stable state which may be interrogated at a later time, the sum core effectively stores the logical result of the information signals applied.

The carry core includes three openings through which windings of each of the three input winding means are positioned. The windings are so arranged that, when any one input winding is exclusively energized, a localized field of substantial flux saturation is established at the location of one of the openings and only the flux in the inner flux path is reversed. The output winding is positioned through another opening in the core to embrace only the outer flux path so that no output is then produced. When two input winding means or all three input winding means are coincidently energized, magnetomotive forces of a direction to reverse the flux are applied to both the inner and outer flux paths at the location of at least one of the openings. The input winding means are positioned so that each applies magnetomotive force in the same direction at the location of each of the openings through which they are threaded. It has been found that, when, with windings positioned in this manner, magnetomotive forces of a sense to reverse the flux are applied to both the inner and outer flux paths at the same location on the core, magnetomotive forces applied in the same direction at other locations are ineffective to prevent flux reversal in either path. As a result when two or all three input winding means are energized coincidently, the flux in the outer flux path is reversed and an output is induced on the carry output winding. The core assumes a stable state after this reversal and the output may be reproduced at a later time by applying an interrogation pulse to the core. Other embodiments illustrate the manner in which plural input EXCLUSIVE OR circuits and coincidence circuits may be constructed in accordance with the principles of the invention. In one embodiment there is shown the manner in which a plurality of coincidence circuits can be constructed utilizing only a single core. Similarly another embodiment and also the full adder described above illustrates that plural input EXCLUSIVE OR circuits may be realized utilizing only a single core. These and other embodiments illustrate that different logical switching functions can be combined in the same core so that the outputs developed are indicative of the result of not one, but of a plurality of successive logical combinations of the input signals.

Accordingly it is another object of the invention to provide an improved magnetic core full adder requiring only a minimum of logical component elements.

A further object is to provide a magnetic core full adder in which all of the logical switching necessary to produce the sum outputs is accomplished by one magnetic core and all of the logical switching necessary to produce the carry outputs is accomplished by another magnetic core.

Another object is to produce a multi-input EXCLUSIVE OR circuit.

Still another object is to provide a multi-input logical circuit capable of producing outputs in response to the coincident application of inputs to predetermined groups of input terminals.

Another object is to provide a multi-path element, having a plurality of input winding means which are arranged so that each, when energized, is effective to apply magnetomotive force to at least one of the flux paths at one or more locations on the core, and having output winding means linking a portion of at least one of the paths at a location where the flux changes produced are dependent upon the combination of the magnetomotive forces applied at the different locations.

Other objects of the invention will be pointed out in the following description and claims and illustrated in the accompanying drawings, which disclose, by way of example, the principle of the invention and the best mode, which has been contemplated, of applying the principle.

Figures 1, 2:
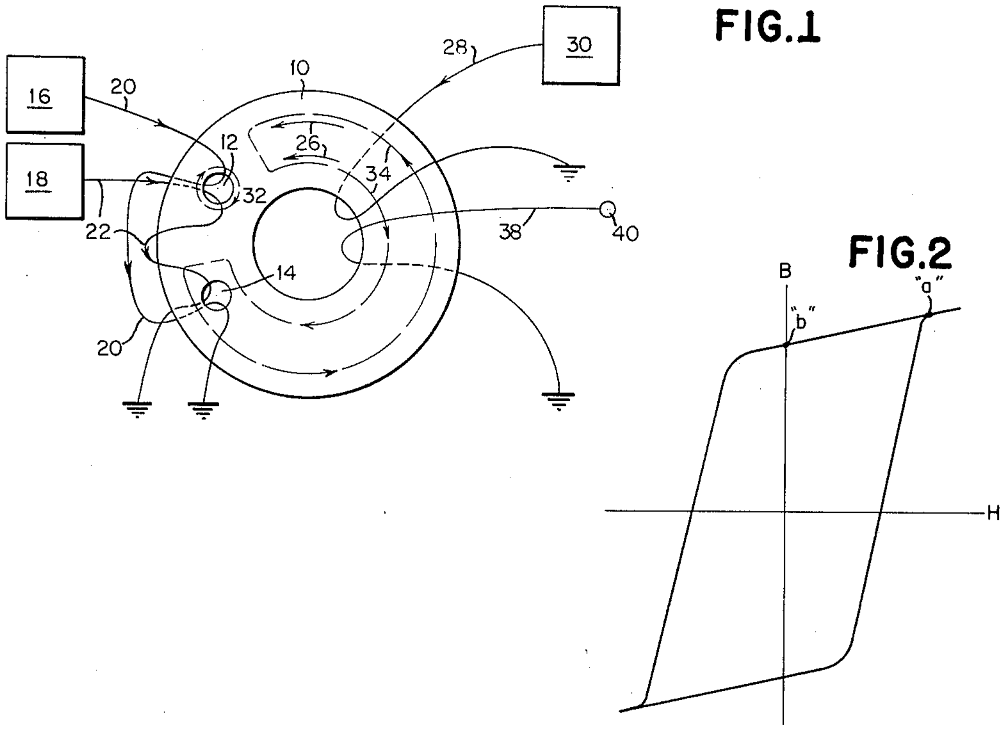
FIG. 1 is a diagrammatic representation of an EXCLUSIVE OR circuit.
FIG. 2 shows a B—H curve for a core of magnetic material and illustrates both the familiar type hysteresis loop and the overall flux changes effected during certain operations when the core is employed as a multi-path or multi-magnetic circuit element.

There is shown in FIG. 1 a magnetic core circuit capable of performing the EXCLUSIVE OR logical switching function and which in operation illustrates some of the basic principles underlying the invention. The circuit includes a core 10 of magnetic material which is pierced at points along its longitudinal axis with openings 12 and 14. The openings 12 and 14 are preferably located in the center of the main circular flux path through the core and may be considered to divide the core material into two circular magnetic circuits or flux paths, one existing primarily between the inner circumference of the core and a circle defined by the innermost portions of the openings and the other existing primarily between the outermost portions of the holes and the outer circumference of the core. These flux paths will, in the descriptions of this and the other embodiments herein disclosed, be referred to as the inner and outer flux paths.

Inputs to the circuit of FIG. 1 are applied by a pair of pulse sources 16 and 18 which are controllable to apply pulses causing current to flow in the direction indicated in a pair of input winding means designated 20 and 22. Each of these winding means is threaded through both of the openings 12 and 14 so that each embraces the portions of the outer flux paths adjacent the openings. Each winding means is threaded to embrace these portions of the outer flux paths with turns of opposite sense and both are threaded so that, with respect to the outer flux path adjacent each opening, winding means 20 is of a sense opposite that of winding means 22. Thus, when pulse generator 16 is actuated to cause current flow in the direction indicated in winding means 20, a clockwise magnetomotive force is thereby applied to the portion of the outer flux path adjacent opening 12 and a counterclockwise magnetomotive force is applied to the portion of the outer flux path adjacent hole 14. Winding means 22 is effective, when pulse generator 18 is actuated, to apply a counterclockwise magnetomotive force to the portion of the outer flux path adjacent opening 12 and clockwise magnetomotive force to the portion of the outer flux path adjacent opening 14.

Before each logical switching operation, it is necessary that the flux throughout the core be reset in the same direction. For this purpose a reset winding 28 is provided which winding is energized by a pulse source 30 which, when actuated, applies a pulse to the winding effective to cause current flow in the direction indicated. Since winding 28 embraces the entire cross sectional area of the core, the passage of current therethrough subjects the entire core, including both the inner and outer flux paths described above, to unidirectional magnetomotive force which in the present case is in a counterclockwise direction. FIG. 2 shows the familiar square type of hysteresis loop obtained by plotting flux density (B) versus magnetic field intensity (H) for a core of magnetic material such as is adaptable for practicing the present invention and, with reference to which, the operation of the cores shown in this and the other disclosed embodiments will be hereafter described. The pulse applied by pulse generator 30 to winding 28 is of sufficient magnitude to cause the core 10, regardless of its initial condition, to be saturated with flux in the counterclockwise direction indicated by arrows 26. This saturation condition is represented on the hysteresis loop of FIG. 1 at "*a*" and the remanent condition in this direction, which the core assumes upon termination of the reset pulse, is indicated at "*b*." With the core in this condition, that is, with the entire core in a remanent condition of flux density in the counterclockwise direction, input pulses may be applied to winding means 20 and 22.

If we consider first that a pulse source 16 is actuated to apply a pulse to winding means 20 and winding means 22 is not energized, the portion of the outer flux path adjacent opening 12 is subjected to a clockwise magnetomotive force and the portion of the outer flux path adjacent opening 14 is subjected to a counterclockwise magnetomotive force. In order to better understand the operation of this and further embodiments, it is thought advisable to state here two of the basic principles which govern the switching phenomena in multipath cores of the type disclosed in this application. The first principle is that when, with the entire core initially saturated in one direction, a magnetomotive force is applied to either the inner or outer half of the core such that the flux produced is in opposition to the initial direction of flux, flux reversal takes place in the inner portion of the core. When the applied magnetomotive force produces flux in the same direction as the initial direction, no flux reversal occurs. The second principle, which is an extension of the first may be stated thusly. When, with the core initially saturated in one direction, magnetomotive forces are applied to either the inner or outer half of the core at several different locations on the core, flux reversal takes place in the inner half of the core if, and only if, the flux produced by at least one of the applied magnetomotive forces is in a direction opposite to the initial saturation.

Following these principles it may be seen that the magnetomotive force applied by the portion of winding means 20 embracing the outer flux path at a point adjacent opening 14, being in the same direction as the initial flux, is ineffective to cause a flux reversal. However, the portion of winding means 20 threaded through hole 12 applies a magnetomotive force of opposite sense which is effective to establish a localized condition of flux saturation, in the clockwise direction indicated at 32, in the core material around the periphery of the opening. The establishing of this localized condition of saturation causes the flux, in the inner portion of the core, remote from opening 12, to be reversed. The flux direction in the outer portion of the core remains unchanged so that a kidneying effect such as is indicated by the arrows 34 is achieved in the portion of the core remote from opening 12. Outputs of the circuit of FIG. 1 are developed on a winding 38 which embraces the entire cross sectional area and thus both the inner and outer flux paths at a point remote from openings 12 and 14. This winding, since it links the inner path, develops an output which is manifested at a terminal 40 when input winding means 20 is energized.

The operation is similar when, with the flux in the entire core initially at remanence in the counterclockwise direction, pulse generator 18 is actuated to apply a pulse to winding means 22 and no pulse is supplied to winding means 20. The application of a pulse to winding means 22 renders this winding means effective to apply a counterclockwise magnetomotive force to the outer flux path at a point adjacent opening 12 and a clockwise magnetomotive force to the outer flux path at a point adjacent opening 14. As a result, a localized field of saturation in a clockwise direction is established in the core material around the periphery of opening 14 and the flux in the portions of the core remote from this saturated area is kidneyed in the same manner as when winding means 20 is energized. The only difference is in the position of the kidney pattern which is established in the portion of the core remote from the localized saturated area which, when winding means 20 is energized exclusively, is around opening 12 and, when winding means 22 is energized exclusively, is around opening 14. The output winding 38 links the core at a point where a reversal of the inner flux path is accomplished in either case and thus one requirement of an EXCLUSIVE OR circuit is satisfied in that when either input winding means is energized exclusively, an output is developed at terminal 40. When, with the entire core initially at remanence in the counterclockwise direction, no input pulse is applied to either winding means during a particular time interval, no output is developed at terminal 40 and the second requirement of EXCLUSIVE OR logical operation is thus satisfied. Finally when, with both the inner and outer flux paths initially at remanence in the counterclockwise direction, winding means 20 and 22 are coincidently energized, these windings apply equal and opposite magnetomotive forces to the outer flux path at the points adjacent openings 12 and 14. Since the net applied magnetomotive force at each point is thus zero, there is no localized magnetic field established; no flux reversal is accomplished; and no output is manifested at terminal 40. Thus, the third requirement of EXCLUSIVE OR logic is satisfied, that is, that no output be developed when both input windings are energized coincidently.

It should here be noted that the flux changes, which produce the outputs at terminal 40, are in each case experienced in the inner flux path and, for this reason, the output winding means may be positioned through a properly located hole so that it embraces only the inner portion of the core. Further, in accordance with the basic principles set out above, the input winding means may be threaded so that they embrace the inner flux path at points adjacent openings 12 and 14 or both windings means may be threaded through the openings so that they embrace a portion of the inner flux path adjacent one opening and a portion of the outer flux path adjacent the other opening. The only requirements in positioning the input winding means are that one winding means, when energized, applies a magnetomotive force, in a direction opposite to the saturation direction, to one of the flux paths at a point adjacent one hole and the other, when energized, applies a similar magnetomotive force to one of the flux paths at a point adjacent the other hole and that the winding means, when energized coincidently, apply equal and opposite magnetomotive forces to the flux path embraced adjacent each opening. Further, note should be made of the fact that the operation is independent of the original direction of flux remanence throughout the core and, thus, for example, the core may be originally reset by winding 28 to remanence in the clockwise direction, in which case the polarity of the output pulses developed at terminal 40 is reversed.

As pointed out in the explanation above, the circuit of FIG. 1 is effective to produce at terminal 40 output pulses in accordance with the EXCLUSIVE OR logical function at the time the input pulses are applied. A logical output pulse, indicative of the time relationship with which the inputs are applied may also be produced at a later time since the core effectively stores the logical result of the input information. When neither input is energized or when both inputs are energized coincidently, the core 10 remains at remanence in the counterclockwise direction. When either input is energized exclusively, the flux in the inner flux path is reversed and upon termination of the input pulse the core assumes a stable state wherein a clockwise remanent flux field exists around one of the openings 12, 14 and the remainder of the core assumes a remanent kidney condition such as indicated by arrows 34. The core may then be interrogated, for example by energizing reset winding 28. When neither or both input winding means have been energized and the core is at remanence at "*b*," the magnetomotive force applied when a pulse is applied to winding 28 causes only a slight flux change such as is indicated by segment "*ba*." However, when either winding means has been energized exclusively, the magnetomotive force applied by winding 28 causes a flux reversal in the inner path. This flux reversal is sensed by output winding 38 thereby causing a significant output signal to be developed at terminal 40.

Figure 3:
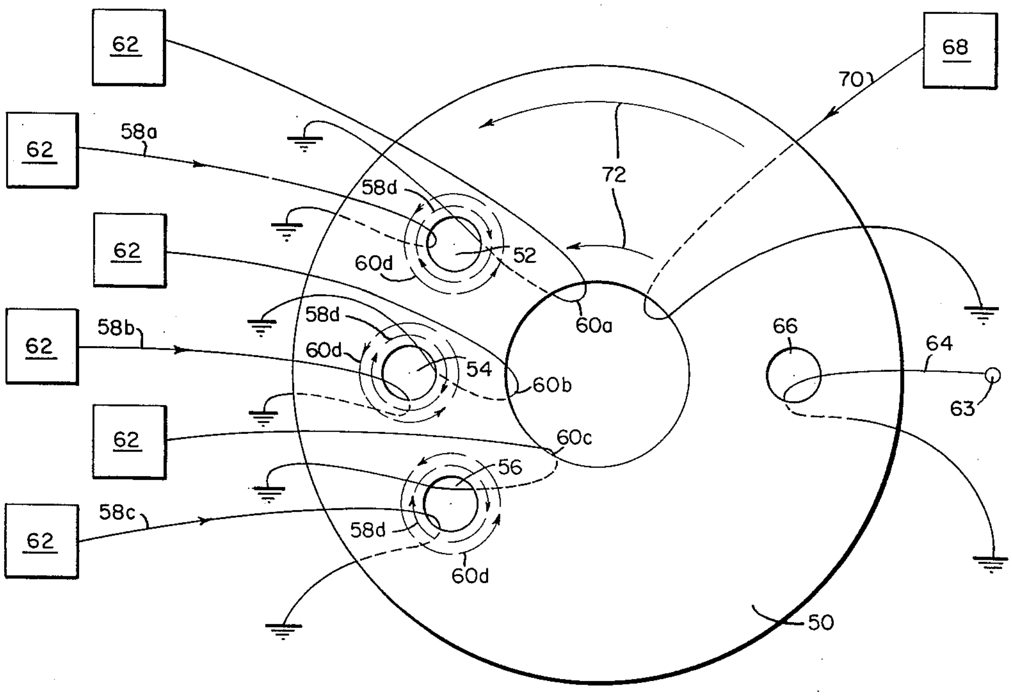
FIG. 3 is a diagrammatic representation of a magnetic core multi-coincidence circuit of the type wherein an output is produced when predetermined pairs of a plurality of input winding means are energized.
Figure 3A:
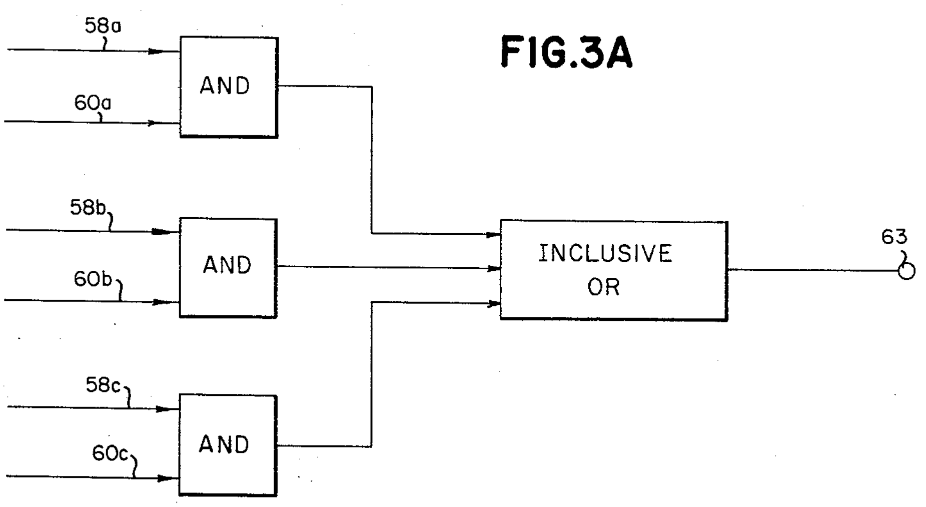
FIG. 3A is a box diagram illustrating the logical switching accomplished by the circuit of FIG. 3.

FIG. 3 represents a further logical circuit constructed in accordance with the principles of the invention and may be utilized to illustrate a third basic principle underlying the invention. The core 50 of FIG. 3 is provided with three input openings 52, 54 and 56. There are six individual input winding means to the circuit of FIG. 3, each having only one winding which embraces the core at the location of one of the openings. These windings are designated **58*a*, 58*b*, 58*c*, 60*a*, 60*b* and 60*c*. Each input winding is connected to one of six input pulse generators 62 which are effective, when actuated, to apply to the associated windings pulses of a polarity to cause current flow in the direction indicated. Outputs for the circuit are developed at an output terminal 63 connected to a winding 64 which, as shown, is threaded through an opening 66 in core 50** so as to embrace only the outer flux path of the core. The logic performed by the circuit of FIG. 3 is illustrated in the box diagram of FIG. 3A wherein the input and output lines are numbered to correspond with the input and output windings in FIG. 3. As shown in FIG. 3A the circuit comprises three AND circuits each of which has connected to it, as inputs, two of the input windings, and an INCLUSIVE OR circuit having connected to it, as inputs, the outputs of the three AND circuits. From this it may be seen that an output is manifested at terminal 63 only when two of the inputs connected to the same AND circuit are energized; that is, when any combination of input signals applied include signals coincidently applied to either leads (windings) 58*a* and 60*a*, 58*b* and 60*b*, or 58*c* and 60*c*.

In order to better understand the operation of the circuit of FIG. 3 in accomplishing this logical switching, a third basic principle underlying the invention should be here stated and that is, that when, with an entire core initially saturated in one direction, magnetomotive forces are applied to the inner and outer flux paths at the same location in such a direction as to completely reverse the flux, magnetomotive forces applied in the same direction to the inner and outer flux paths at other locations do not affect the direction of flux reversal. The core 50 of FIG. 3 is reset before initiation of logical operation by a pulse generator 68 which when actuated causes current flow in the direction indicated in a reset winding 70. This reset winding is then effective to apply to the entire core a magnetomotive force of sufficient magnitude to cause the core, regardless of its initial condition, to assume a condition of flux remanence in the counterclockwise direction, as indicated by arrows 72. This condition is represented in FIG. 2 at "*b*." Each of the input windings is positioned through one of the openings so that, when the connected pulse generator 62 is actuated, the winding applies a clockwise magnetomotive force to the embraced inner or outer flux path. In accordance with the first and second principles, stated previously in describing the operation of FIG. 1, such a magnetizing force is effective to establish a localized field of saturation around the opening through which it is positioned. These localized fields are established in the clockwise direction, as indicated at 58*d*, when one or more of the windings 58*a*, 58*b*, and 58*c* are energized and in the counterclockwise direction as indicated at 60*d* when one or more of the windings 60*a*, 60*b* and 60*c* are energized. Thus, when an input signal is applied separately to any one of the six input windings, a localized field of saturated flux is established around the opening through which that winding is positioned and the flux in the inner flux path in the portion of the core remote from the opening is reversed. Since the output winding 64 embraces only the outer flux path, no significant output is then developed at terminal 63. The same is true when more than one input winding is energized as long as both windings positioned through the same hole and respectively embracing both the inner and outer flux paths at that point are not energized coincidently. For example, all three windings 58*a*, 58*b*, and 58*c* may be coincidently energized, in which event conditions of substantial flux saturation in a clockwise direction are established around the openings 52, 54 and 56 and only the inner flux path in the portion of the core remote from these openings is reversed. The same is true where all three windings 60*a*, 60*b* and 60*c* or combinations of windings, such as 58*a*, 60*b* and 60*c* are energized coincidently, the only difference being in the direction of the saturated flux around the openings.

When, however, with the core 50 reset at remanence in the counterclockwise direction, two input windings, which respectively embrace the inner and outer flux paths at the same location, are energized coincidently, for example windings 58*a* and 60*a*, each applies a magnetomotive force in a different direction to the localized path around the opening. As a result the magnetomotive forces which are both clockwise, with respect to the longer inner and outer flux paths around the core, are applied effectively to these paths and being of sufficient magnitude cause a flux reversal to be experienced throughout the circular length of both the inner and outer flux paths. Since winding 64 links the outer flux path, an output voltage is then induced on this winding and an output signal is produced at terminal 63. This flux reversal throughout the core is effected when signals are applied to two input windings, which respectively embrace the inner and outer portions of the core at the same location, regardless of whether or not inputs are applied at the same time to one or more of the other windings. Thus, in accordance with the third principle stated above, when windings 58*a* and 58*b* are coincidently energized the flux in both the inner and outer flux paths is reversed and an output is produced at terminal 63, whether or not any one or more of the other input windings are energized at the same time.

As in the case of FIG. 1, an output indicative of the logical combination of inputs previously applied may be produced at a later time by applying to the core an interregation pulse which may be in the form of a reset pulse applied to winding 70. When the inputs applied are such that no two windings positioned through the same opening have been energized coincidently or when no inputs have been applied, the flux in the outer flux path remains in the initial counterclockwise direction and the application of a reset pulse to winding 70 causes no significant flux change in this path and thus, no appreciable output is generated at terminal 63. However, when any two input windings positioned through the same opening have been coincidently energized to thereby reverse the flux in both the inner and outer flux paths, the subsequent energization of winding 70 resets both paths back to the counterclockwise direction causing a significant voltage to be induced on winding 64 and manifested at therminal 63.

Figure 4A:
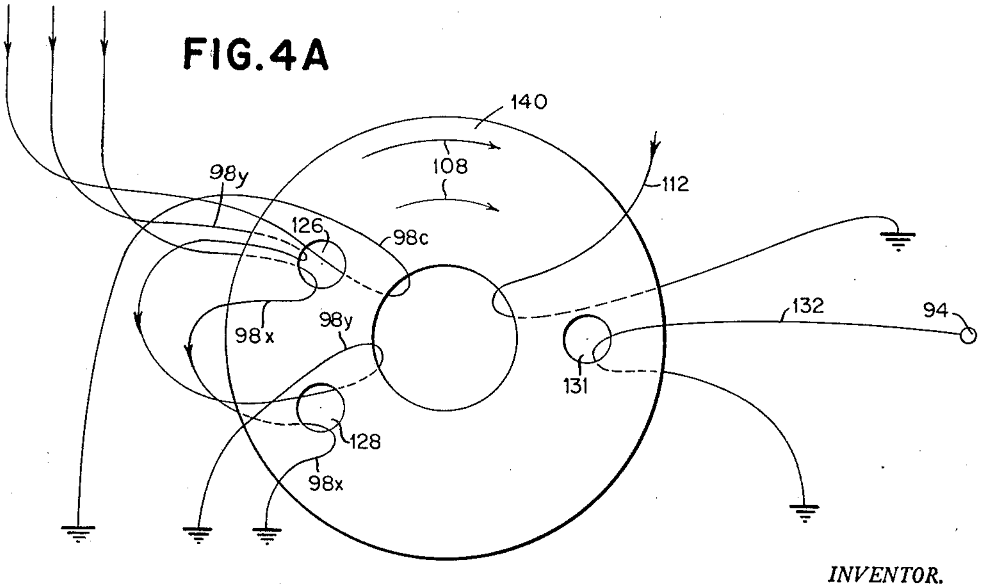
FIG. 4A shows a further embodiment of a carry core such as might be used in binary full adder circuitry as shown in FIG. 4.
Figure 4:
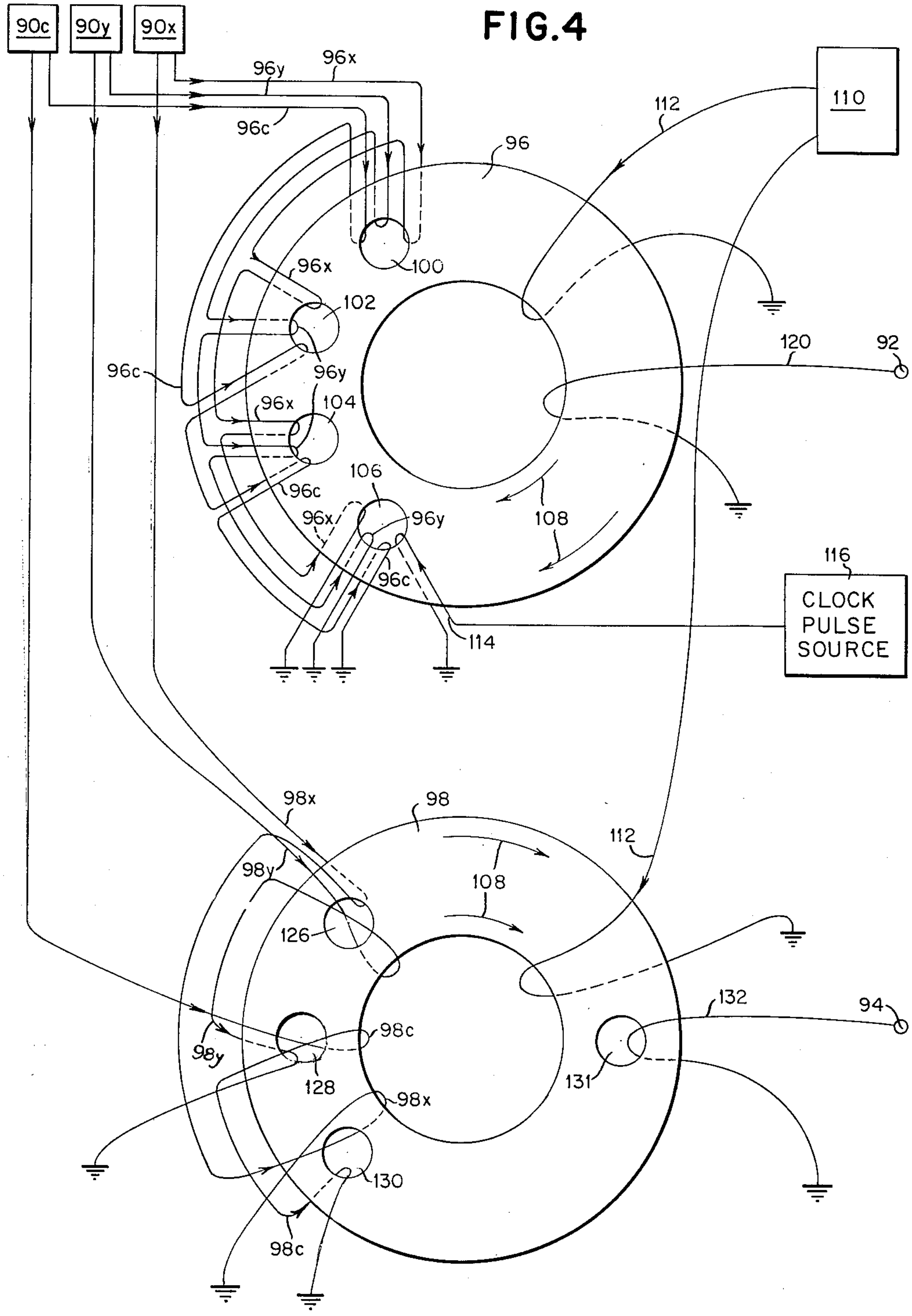
FIG. 4 is a diagrammatic representation of a binary full adder constructed in accordance with the principles of the invention.

There is shown in FIG. 4 a circuit capable of performing the logical switching required of a binary full adder. A binary adder is a three input, two output device. In the circuit of FIG. 4 the inputs to the circuit are applied by signal sources 90*c*, 90*y*, and 90*x* and the outputs developed at a sum output terminal 92 and a carry output terminal 94. In accordance with the rules of binary addition an output is developed at terminal 92 and no output developed at terminal 94 when a signal is applied by any one of the input signal sources exclusively; no output is developed at terminal 92 and an output is developed at terminal 94 when any two of the input signal sources apply input pulses coincidently; and outputs are developed at both output terminals, when all three input signal sources apply pulses coincidently. The circuit utilizes as switching elements a pair of multipath cores designated 96 and 98. Core 96 performs the necessary switching to produce the required sum outputs at terminal 92 and is referred to as the sum core. Core 98 performs the logical switching necessary to produce the required carry outputs at terminal 94 and is referred to as the carry core.

There are connected to the input signal sources 90*c*, 90*x* and 90*y* three sets of windings 96*c*, 96*x* and 96*y* which are inductively associated with sum core 96 and these sets of windings 98*c*, 98*x* and 98*y* which are inductively associated with the carry core 98. The input pulses applied by sources 90*c*, 90*y* and 90*x* are of a polarity to cause current flow in the direction indicated in each of these windings. The sum core 96 is provided with four openings 100, 102, 104 and 106 through each of which a corresponding one of the input windings, 96*c*, 96*x* and 96*y*, in each set is positioned to embrace the outer flux path at the four locations adjacent these openings. Thus, each set of windings may, for the purposes of illustration, be considered to include four windings, each winding embracing the outer flux path adjacent a different one of the openings 100, 102, 104 and 106.

Anticipatory of logical operation, both the inner and outer flux paths of each of the cores 96 and 98 are reset to a stable state of flux remanence in the clockwise direction as indicated by arrows 108. This resetting is accomplished by a signal source in the form of a pulse generator 110 which, when actuated, applies to each of a pair of reset windings 112 a pulse effective to cause current flow in the direction indicated. Each of the sets of windings **96*c*, 96*x* and 96*y* include two windings which, when energized, apply to the outer flux path, at a point adjacent two of the openings, magnetomotive force in a counterclockwise direction and two windings which, when energized, apply to the outer flux path at a point adjacent the other two openings, magnetomotive force in a clockwise direction. A further winding designated 114 is threaded through opening 106 to embrace the outer flux path at this point. This winding is energized by a signal source in the form of a clock pulse generator 116 which is effective to apply a pulse of a polarity to cause current flow in the direction indicated in winding 114 during each input time interval coincident with the application of pulses by signal sources 90*c*, 90*x* and 90*y*. The design is such that the magnetomotive force applied by winding 114 is in a clockwise direction and is essentially twice that applied by any one of the windings 96*c*, 96*x* and 96*y*. If we consider the magnetomotive force applied by the different windings to be negative (−), when in the clockwise direction and thus in a direction to produce flux in the direction of initial remanent flux condition, and positive (+), when in the counterclockwise direction and thus in a direction to reverse the direction of initial remanent flux, the operation of the circuit may be better understood by referring to the table below which depicts, using this notation, the direction of magnetomotive force applied by each winding at each of the four openings. Since the magnetomotive force applied by winding 114** is twice that applied by each turn of the three input windings it is set out as two units in the negative direction, whereas the magnetomotive forces applied by the individual windings are set out as one unit in the appropriate direction.

*Magnetomotive Force Applied to Outer Flux Path Adjacent Openings*

| | 100 | 102 | 104 | 106 |
|---|---|---|---|---|
| Winding 96*c* | −1 | −1 | +1 | +1 |
| Winding 96*x* | +1 | −1 | −1 | +1 |
| Winding 96*y* | −1 | +1 | −1 | +1 |
| Winding 114 | -------- | -------- | -------- | −2 |

As has been pointed out, it is required that an output be produced at sum terminal 92, when either one of the sets of input windings is energized exclusively and when all three are energized coincidently, and no output be manifested, when no set of input windings is energized and when any two of the sets of input windings is energized coincidently. It should first be noted that where no inputs are applied to input windings during an input time interval, the only magnetomotive force applied to the core is the clockwise (−) magnetomotive force applied by winding 114 to the outer flux path at a point adjacent opening 106. In accordance with the principles heretofore set forth, this magnetomotive force is ineffective to cause a flux reversal in either the inner or outer path and thus no voltage is developed on an output winding 120 to which sum output terminal 92 is connected. When all three sets of input windings **96*c*, 96*x* and 96*y* are coincidently energized, it may be seen by referring to the table that the net magnetomotive force applied to the outer flux path adjacent opening 106 is clockwise (+) and thus in the proper direction to reverse the flux in the outer path. A localized condition of flux saturation is then established around this opening causing a flux reversal in the portion of the inner flux path embraced by winding 120. A voltage is thus induced in winding 120 and an output signal is produced at terminal 92**. Referring to the table, it may be seen that the net fields applied at each of the other openings, when three inputs are coincidently applied, are negative and thus clockwise so that they are of themselves ineffective to cause a flux reversal in either the inner or outer flux path.

When any one of the sets of input windings is energized exclusively, a localized area of flux saturation is established around one of the openings and the net fields applied adjacent the other openings are either substantially zero or clockwise (−). For example, when windings **96*c* are energized exclusively, the magnetomotive force applied adjacent opening 100 is negative, adjacent 102 is negative, adjacent 104 is positive and thus effective to cause a localized condition of flux saturation to be established around this opening, and adjacent opening 106 is negative since the magnetomotive force applied by winding 114 is negative and twice that applied by the winding 96*c* at that location. The operation is similar when any one of the sets of input windings is energized exclusively, a localized field of saturation being established around opening 100 when windings 96*x* are energized exclusively and around opening 102 when windings 96*y* are energized exclusively. In each case, the establishing of the localized field of saturation causes a flux reversal in the inner flux path in the portion of the core embraced by winding 120. This flux reversal causes a voltage to be developed on winding 120 and an output signal to be manifested at terminal 92**.

When any two of the sets of input windings are energized coincidently, the net magnetomotive forces applied at each of the four holes is either negative or substantially zero and neither the inner nor outer flux path experiences a flux reversal and no output is developed on winding 120. For example, when the windings **96*c* and 96*x* are coincidently energized, the net magnetomotive forces applied to the outer flux path adjacent openings 100, 104 and 106 are zero, and adjacent opening 102 is negative. Thus, when any two sets of input windings are energized coincidently neither the inner nor the outer flux paths in the portion of the core embraced by winding 120 experiences a flux reversal and no output is developed at terminal 92**.

As has been stated above, it is required that an output be developed at carry output terminal 94 when signals are coincidently applied by any two or all three of the pulse generators **90*c*, 90*x* and 90*y*. This logical switching is accomplished by carry core 98. Both the inner and outer flux paths of this core are initially reset, by the reset pulse applied by pulse generator 110 to reset windings 112, to a stable state of flux remanence in the clockwise direction. Core 98 contains three openings 126, 128 and 130 through which the input windings are positioned and a further opening 131 through which an output winding 132, which is connected to carry output terminal 94, is positioned to embrace only the outer flux path. There are three sets of input windings, each set containing two windings and both windings in the first set are designated 98*c*, in the second set 98*x*, and in the third set 98*y*. The switching operation of this core involves principles discussed in the description of the operation of the logical circuit of FIG. 3. Each one of the input windings is threaded through one of the three openings and each set has one winding threaded to embrace the inner flux path at a point adjacent one opening and another winding threaded to embrace the outer flux path at a point adjacent another opening. Pulse generators 90*c*, 90*y* and 90*x* apply signals of a polarity to cause current flow in each of the windings 98*c*, 98*x* and 98*y* in the direction indicated. The windings are arranged so that each is effective to apply counterclockwise magnetomotive forces to the embraced path at the location of the opening through which it is positioned. For example, windings 98*x***, when energized, apply a counterclockwise magnetomotive force to the outer flux path at a point adjacent opening 126 and a counterclockwise magnetomotive force to the inner flux path at a point adjacent opening 130. When this set of windings is energized exclusively, localized conditions of saturation are established around each of these openings causing the flux in the inner flux path in the portion of the core remote from the openings to be reversed. Since output winding 132 embraces only the outer flux path no output is then developed at terminal 94. Similarly, when either of the other two sets of input windings are energized exclusively, localized conditions of saturation are established around the two openings through which the windings are positioned and only the flux in the inner flux path is reversed and no output is generated at terminal 94. However, when any two of the sets of windings are energized coincidently, counterclockwise magnetomotive forces are applied to both the inner and outer flux paths at the location of one of the openings and, since the magnetomotive forces applied by the energized windings at the locations of the other openings are in the same direction, the flux in both the inner and outer flux paths is reversed. An output is then developed on winding 132, which embraces the outer flux path, and manifested at terminal 94. For example, when windings 98*x* and 98*y* are energized coincidently, counterclockwise magnetomotive forces are applied to both the inner and outer flux paths at the location of opening 126, a counterclockwise magnetomotive force is applied to the outer flux path at a point adjacent opening 128, and a counterclockwise magnetomotive force is applied to the inner flux path at a point adjacent opening 130. The magnetomotive forces applied to both paths at a point adjacent opening 126 are thus effective, in accordance with the third basic principle, which was stated in describing the operation of the embodiment FIG. 2, to cause a flux reversal to be experienced in both the inner and outer flux paths. The same is true when any two of the sets of input windings are energized coincidently, counterclockwise magnetomotive forces being coincidently applied to both the inner and outer paths at the location of one opening and the flux throughout the core being reversed. When all three sets of windings are coincidently energized, the inner and outer flux paths are subjected to counterclockwise magnetomotive forces at the location of each of the three openings causing a flux reversal in both the inner and outer flux paths and, since output winding 132 embraces the outer path, an output is then developed at terminal 94.

FIG. 4A shows another embodiment of a core circuit capable of performing the switching functions required to produce the carry outputs of a full adder. Corresponding parts in the two figures are given corresponding numeric designations to facilitate the explanation. The reset and output circuitry is the same as in the embodiment of FIG. 4, the primary difference between the two embodiments lying in the fact that the multi-path core 140 of FIG. 4A contains only two openings 126 and 128 through which the sets of input windings 98*x*, 98*y* and 98*z* are positioned. There are two windings 98*x*, each positioned through one of the openings to embrace the outer flux path at a point adjacent that opening. One winding 98*y* is positioned through opening 126 to embrace the outer flux path at a point adjacent that opening and another winding 98*y* is positioned through opening 128 to embrace the inner flux path adjacent that opening. There is only a single winding 98*c* and it is threaded through opening 126 and embraces only the inner flux path. As before the windings are of a sense so that when energized each is effective to apply clockwise magnetomotive force to the flux path embraced at the location of each hole through which it is positioned. When either set of windings 98*x* or 98*y* is energized exclusively, localized conditions of flux saturation are established about both openings, and when winding 98*c* is energized exclusively a localized condition of flux saturation is established around opening 126 only. In any of these three cases only the flux in the inner flux path is reversed and no output is indicated in winding 132. When either set of windings 98*x* or 98*y* and the winding 98*c* are energized coincidently, counterclockwise magnetomotive forces are applied to both the inner and outer flux paths at the location of opening 126 and, when windings 98*x* and 98*y* are energized coincidently, counterclockwise magnetomotive forces are applied to both the inner and outer paths at the location of opening 128. Thus, when any two of the three input winding means are coincidently energized, the flux in the entire core is switched and an output is induced in winding 132. When all three input winding means are coincidently energized counterclockwise magnetomotive forces are again applied to both the inner and outer flux paths at the location of opening 128 and the flux is reversed throughout the entire core and an output is induced in winding 132. In each of the above described operations when two or more windings are coincidently energized to coincidently apply counterclockwise magnetomotive forces to both flux paths at the location of one of the openings, a counterclockwise magnetomotive force is also applied to one of the paths at the location of the other opening. However, as has been pointed out previously, in stating the basic principles underlying the invention, when magnetomotive forces are applied in this manner, the flux in both the inner and outer flux paths is reversed.

Since both the cores 96 and 98 in the circuit of FIG. 4, and also the alternate embodiment for the carry core shown in FIG. 4*a* are caused to assume different stable states when the combination of input pulses is such as to produce an output at the connected output terminal, these cores store the result of the binary addition of the information signals, applied by the input pulse generators 90*c*, 90*y* and 90*x*. The outputs indicative of the binary addition of inputs applied during any time interval may thus be reproduced at a later time, in the same manner as was described with reference to the circuits of FIGS. 1 and 3, by pulsing the reset winding.

Though the pulses, supplied to the sum and carry cores in the circuit of FIG. 4, and also the alternate embodiment of the carry core of FIG. 4*a*, are shown to be applied individually to the three sets of windings linking each core, it is of course apparent that the winding means connected to the same pulse sources might be connected in series circuit relationship. For example, the connection of winding means 98*x* to source 90*x* may be eliminated and this winding means connected in series with winding means 96*x*, in which case the ground connection of winding 96*x* is also eliminated. Winding means 96*c* and 98*y* may be similarly connected in series with winding means 96*c* and 96*y*, respectively.

It should here be noted that the embodiment of FIG. 4*a*, as well as the similar structure in FIG. 4 which performs the logic necessary to produce the carry outputs, may be termed a majority function logical circuit in that it produces an output only when input pulses are coincidently applied to at least a majority of the input windings.

It should also be noted that the circuit might be operated in essentially the same manner with bias winding 114 continuously energized by a direct current source.

Further note should be made of the fact that the EXCLUSIVE OR circuit of FIG. 1, which is a two input circuit, may be extended following the principles of the invention to include as many inputs as desired, the only limitation being the physical size of the core. This is illustrated in the embodiment of the core 96 of FIG. 4. If, in that structure, the windings 96*c*, 96*x* and 96*y* were threaded only through openings 100, 102 and 104 and opening 106 as well as clock pulse winding 114 were eliminated, the structure would comprise a three input EXCLUSIVE OR circuit wherein an output is produced at terminal 92 when any one of the sets of input windings 90*c*, 90*x* or 90*y* is energized exclusively, and no output is produced when one or two or more of the sets of windings are energized. The explanation of this operation lies in the fact, previously described, that, when any one of the sets of input windings is energized exclusively, an area of localized flux saturation is established around one of the openings 100, 102, 104 thereby causing a flux reversal in the inner flux path effective to induce an output on winding 120. When two or more of the sets of input windings are coincidently energized, the net magnetomotive forces applied to the outer flux path at the location of openings 100, 102, 104, are either zero or negative and no flux reversal is experienced in the portion of the core embraced by winding 120. Further note should be made of the fact that whether, as shown in FIG. 4, the sum core is a full adder or modified as explained above to serve as a three input EXCLUSIVE OR circuit, the input windings positioned through core 96 at any of the opening locations may be wound to embrace either the inner or outer flux paths. Since the output winding 120 in the operations described senses flux changes only in the inner flux path, that winding may be positioned through an appropriately pierced opening to embrace only that path.

While there have been shown and described and pointed out the fundamental novel features of the invention as applied to a preferred embodiment, it will be understood that various omissions and substitutions and changes in the form and details of the devices illustrated and in its operation may be made by those skilled in the art without departing from the spirit of the invention. It is the intention therefore, to be limited only as indicated by the scope of the following claims.

What is claimed is:

1. In a magnetic circuit, a core of magnetic material, said core having a plurality of openings positioned therethrough dividing the core material into first and second parallel flux paths, a first plurality of input windings each positioned through a different one of said openings, each of said windings embracing only one of said flux paths at the location of the opening through which it is positioned, means inductively associated with said core for initially establishing a condition of unidirectional flux remanence throughout the core material, means for applying pulses to said input windings, the sense of said windings being such that a pulse applied by said pulse means to any one of said windings is effective to establish a localized condition of substantial flux saturation in the magnetic material at the location of the opening through which the pulsed winding is positioned, a second plurality of input windings each inductively associated with said core at the location of at least one of said openings, said pulse applying means including means for applying pulses to the windings in said second plurality; the sense of each of said windings in said second plurality being such that a pulse applied by said pulse means to any of said windings in said second plurality is effective to render a pulse, coincidently applied to the winding in said first plurality which is positioned through the opening at the location at which the pulsed winding in said second plurality is inductively associated with said core, ineffective to establish a localized condition of substantial flux saturation at the location of said opening, and output winding means inductively associated with said core.

2. In a magnetic circuit, a core of magnetic material, said core having a plurality of openings positioned therethrough dividing the core material into first and second parallel flux paths, a first plurality of input windings each positioned through a different one of said openings, a second plurality of input windings each positioned through a different one of said openings, there being positioned through at least some of said openings one of said windings in said first plurality and one of said windings in said second plurality, each of said windings embracing only one of said flux paths at the location of the opening through which it is positioned, means inductively associated with said core for initially resetting said core to a condition wherein each of said flux paths is in a stable state of flux remanence in the same direction, means coupled to said input windings for applying pulses thereto; the sense of said windings being such that the application of a pulse to a winding in said first plurality, in the absence of the application of a pulse to a winding in said second plurality positioned through the same opening, is effective to establish a localized magnetic field around the opening through which the pulsed winding is positioned and the application of a pulse to a winding in said first plurality, in the presence of a pulse coincidently applied to a winding in said second plurality positioned through the same opening is ineffective to establish a localized magnetic field around the opening through which the pulsed windings are positioned; and output winding means, for producing outputs indicative of the time relationship with which pulses are applied to said input windings, inductively associated with said core.

3. A logical circuit comprising an element of magnetic material defining a closed flux path and having at least a portion thereof divided into parallel magnetic flux paths, a plurality of input winding means each inductively associated with said core at a plurality of different locations in said portion of said core, each of said winding means embracing only one of said parallel flux paths at each of said locations at which it is inductively associated with said portion of said core and different combinations of said winding means being inductively associated with said core at different ones of said locations, and output winding means inductively associated with said core.

4. In a binary adder circuit, a first magnetic circuit and a second magnetic circuit each capable of assuming at least two different stable states, and each normally in one of the stable states it is capable of assuming, first, second and third input winding means, means coupled to said input winding means for applying energizing information signals thereto during an input time interval; said first, second and third winding means being inductively associated with said magnetic circuits at a plurality of locations for producing in said magnetic circuits changes to cause said first magnetic circuit to assume the other of said stable states only when one of said winding means is energized exclusively and when all three of said winding means are energized coincidently, and to cause said second magnetic circuit to assume the other of said stable states only when two or more of said winding means are energized coincidently, first individual output means inductively associated with said first magnetic circuit for sensing changes in said first magnetic circuit from one of said states to the other, and second individual output means inductively associated with said second circuit for sensing changes in said second magnetic circuit from one of said stable states to the other.

5. In a binary adder circuit, a first magnetic circuit and a second magnetic circuit each capable of assuming at least two different stable states, and each normally in one of the stable states it is capable of assuming, first, second and third input winding means, means coupled to said input winding means for applying energizing information signals thereto during an input time interval; said first, second and third winding means being inductively associated with said magnetic circuits at a plurality of locations for producing in said magnetic circuits flux changes to cause said first magnetic circuit to assume the other of said stable states only when one of said winding means is energized exclusively and when all three of said winding means are energized coincidently, and to cause said second magnetic circuit to assume the other of said stable states only when two or more of said windings are energized coincidently, means associated with each of said magnetic circuits and operative after said input time interval for applying to said circuits magnetomotive force in a proper direction and sufficient in magnitude to cause each to assume said normal state, first individual output means inductively associated with said first magnetic circuit for sensing changes in said first magnetic circuit from one of said states to the other, and second individual output means inductively associated with said second circuit for sensing changes in said second magnetic circuit from one of said stable states to the other.

6. A magnetic core full adder circuit comprising a sum magnetic core and a carry magnetic core, first, second and third input winding means, sum output winding means inductively associated with said sum core, carry output winding means inductively associated with said carry core, means for applying input pulses to said input windings; said winding means inductively associated with said sum core at a plurality of separate locations on said core for producing in said core flux changes to change the state of said core when a pulse is exclusively applied to any one of said input winding means and when input pulses are coincidently applied to each of said first, second and third winding means to cause an output to be induced in said sum output winding, said winding means inductively associated with said carry core at a plurality of separate locations on said core for producing in said carry core flux changes to change the state of said core when input pulses are coincidently applied to two or more of said input winding means to cause an output to be induced in said carry output winding.

7. In a magnetic core logical circuit, a first core of magnetic material having at four different locations four separate openings dividing said first core into first and second parallel flux paths, a second core of magnetic material having at three different locations three separate openings dividing said second core into first and second parallel flux paths; first, second and third input winding means each including windings embracing a like one of said flux paths at each of said four locations in said first core and each including windings embracing one of said flux paths of said second core at two of said three locations on said core, further input winding means including a winding embracing one of said flux paths at one of said locations on said first core, input pulse means coupled to said input winding means for applying energizing pulses to said windings; a first output winding embracing, at a location remote from said four locations on said first core, at least the one of said first and second flux paths of said first core which has the shorter flux path length; and a second output winding embracing, at a location remote from said three locations on said second core, at least the one of said first and second flux paths of said second core which has the greater flux path length.

8. A magnetic core binary full adder circuit, comprising a magnetic sum core, having multiple flux paths, a magnetic carry core, having multiple flux paths, a sum output winding embracing at least a portion of said sum core, a carry output winding embracing at least a portion of said carry core, first, second and third input winding means, and means for applying information pulses to said input winding means; said first, second and third winding means being inductively associated with said sum core at a plurality of locations on said core for producing in said portion of said sum core flux changes effective to produce an output in said sum winding only when an energizing pulse is applied exclusively to any one of said winding means and when energizing pulses are applied coincidently to all three of said winding means; said first, second and third input winding means being also inductively associated with said carry core at a plurality of locations on said core for producing in said portion of said carry core flux changes effective to produce an output in said carry winding only when energizing pulses are applied coincidently to any two or more of said input winding means.

9. A magnetic core binary full adder circuit, comprising a magnetic sum core, having multiple flux paths, a magnetic carry core, a sum output winding embracing a portion of said sum core, having multiple flux paths, a carry output winding embracing a portion of said carry core, first, second and third input winding means, means for applying information pulses to said input winding means; said first, second and third winding means being inductively associated with said sum core at a plurality of locations on said core, a bias winding inductively associated with said sum core at one of said locations on said sum core at which said input winding means are inductively associated with said sum core, and means coupled to said bias winding for applying energizing clock pulses thereto so that said first, second and third input winding means are capable of producing in said portion of said sum core flux changes effective to produce an output in said sum winding only when an energizing pulse is applied exclusively to any one of said winding means and when energizing pulses are applied coincidently to all three of said winding means, said first, second and third input winding means being also inductively associated with said carry core at a plurality of locations on said core for producing in said portion of said carry core flux changes effective to produce an output in said carry winding only when energizing pulses are applied coincidently to any two or more of said input winding means.

10. In a magnetic logical circuit, first and second magnetic cores each having at three different locations three different openings therethrough, said openings dividing each core into first and second parallel flux paths; first, second and third individual input winding means each embracing at least one of said flux paths of said first core at each of said three locations on that core and each embracing at least one of said flux paths of said second core at only two of said three locations on said second core; first output winding means embracing at least one of said flux paths of said first core at a location remote from said three locations of said first core, and second output winding means embracing at least one of said flux paths of said second core at a location remote from said three locations in said second core.

11. In a magnetic core logical circuit, first and second magnetic cores each having at three different locations three separate openings therethrough, first, second and third individual input winding means each having windings inductively associated with said first core at said three locations on said first core and each having windings inductively associated with said second core at least two of said three separate locations of said second core, first output winding means inductively associated with said first core, and second output winding means inductively associated with said second core.

12. In a circuit for producing, in accordance with the rules of binary addition, sum and carry outputs in response to the application of input information pulses to three separate inputs; a first core of magnetic material having, at first, second, third and fourth locations, first, second, third and fourth openings dividing said first core into first and second parallel flux paths; a second core of magnetic material having, at first, second and third locations, first, second and third openings dividing said second core into first and second parallel flux paths; first, second and third input winding means each embracing said first flux path of first core at said fourth location with a winding of a first sense and each embracing said first flux path at a different one of said first, second and third locations of said first core with a winding of said first sense and embracing said first flux path at the remaining two locations with a winding of opposite sense; said first, second and third input windings each embracing said first flux path of said second core at a different one of said first, second and third locations and each embracing said second flux path at a different one of said locations, pulse means coupled to said input winding means for applying information pulses thereto, a bias winding embracing said first core at said fourth location of said first core, means coupled to said bias winding for applying clock pulses thereto, a sum output winding embracing at least one of said flux paths of said first core at a location remote from said openings in said first core, and a carry output winding embracing at least one of said flux paths of said second core at a location remote from said openings in said second core.

13. A logical magnetic core circuit comprising a core of magnetic material having at first and second locations first and second openings therethrough dividing said core into first and second parallel flux paths, a first input winding positioned through said first opening to embrace only said first flux path at said first location, a second input winding positioned through said second opening to embrace only said first flux path at said second location, a third input winding positioned through said second opening to embrace only said second flux path at said second location, means inductively associated with said core for initially causing each of said flux paths to assume a stable state of flux remanence in a first direction, means for applying input energizing pulses to said windings; the sense of said input windings being such that each of said windings is effective when energized to apply, to the flux path it embraces at the location of the opening through which it is positioned, magnetomotive force in a direction opposite to said first direction, and output winding means inductively associated with said core.

14. The invention as claimed in claim 13 wherein said first input winding and one of said second and third input windings are connected in series circuit relationship.

15. The invention as claimed in claim 14 wherein said first and said third input windings are connected in series circuit relationship.

16. A logical magnetic core circuit comprising a core of magnetic material having, at first, second and third locations, first, second and third openings therethrough dividing said core into first and second parallel flux paths; first, second and third pairs of input windings respectively positioned through said first, second and third openings, one of said windings in each pair being positioned to embrace only said first flux path and the other winding of each pair being positioned to embrace only said second flux path at the location of the opening through which they are positioned, means coupled to said windings for applying input pulses thereto, and output winding means embracing one of said flux paths at a point remote from the locations of said openings.

17. The invention as claimed in claim 16 wherein one of the windings in each pair is series connected to one of the windings in another one of said pairs.

18. A logical magnetic core circuit comprising a core of magnetic material having, at first, second and third locations, first, second and third openings therethrough dividing said core into first and second parallel flux paths; first, second and third pairs of input windings respectively positioned through said first, second and third openings, one of said windings in each pair being positioned to embrace only said first flux path and the other winding of each pair being positioned to embrace only said second flux path at the location of the opening through which they are positioned, means inductively associated with said core for initially causing each of said flux paths to assume a stable state of flux remanence in a first direction, means for applying input energizing pulses to said windings; the sense of said input windings being such that each said winding is effective when energized to apply to the flux path it embraces at the location of the opening through which it is positioned magnetomotive force in a direction opposite to said first direction, and output winding means inductively associated with said core.

19. In a magnetic core circuit, a core of magnetic material having first and second openings therethrough dividing said core into first and second parallel flux paths, a first input winding positioned through said first opening to embrace only said first flux path at the location of said first opening, a second input winding positioned through said first opening to embrace only said second flux path at the location of said first opening, a third input winding positioned through said second opening to embrace only said first flux path at the location of said second opening, a fourth input winding positioned through said second opening to embrace only said second flux path at the location of said second opening, pulse means coupled to said windings for applying energizing pulses thereto, and output winding means embracing at least one of said flux paths.

20. In a magnetic circuit, a core of magnetic material having at first, second and third locations, first, second and third openings dividing the core into first and second parallel flux paths, first input winding means including first and second series connected windings respectively embracing said first flux path at said first location and said second flux path at said second location, second input winding means including third and fourth series connected windings respectively embracing said first flux path at said second location and said second flux path at said third location, third input winding means including fifth and sixth series connected windings respectively embracing said second flux path at said first location and said first flux path at said third location, and output winding means embracing at least one of said flux paths at a location remote from said first, second and third locations.

21. In a magnetic core logical circuit, a core of magnetic material having an inner and an outer periphery, said core having a plurality of openings positioned therethrough at different locations, said openings dividing said core into first and second parallel flux paths, said flux paths respectively being parallel to the inner and outer periphery of said core, a plurality of input windings each positioned through at least one of said plurality of openings, each of said windings being positioned to embrace only one of said flux paths of the location of the opening through which it is positioned and all of said windings being positioned to embrace the same one of said flux paths at the location of the same opening, and output winding means embracing at least one of said flux paths.

22. The invention as claimed in claim 21 wherein each of said input windings is positioned to embrace said first flux path at the location of each of said openings.

23. The invention as claimed in claim 21 wherein each of said windings but one winding at a first one of said locations is connected to a different one of the windings at each of the other locations and said one winding at said first location is unconnected to any of said other windings.

24. In a magnetic core logical circuit, a core of magnetic material having a plurality of openings positioned therethrough at different locations, said openings dividing said core into first and second parallel flux paths, a plurality of input windings each positioned through at least one of said plurality of openings, each of said windings being positioned to embrace only one of said flux paths at the location of the opening through which it is positioned and all of said windings being positioned to embrace the same one of said flux paths at the location of the same opening, means coupled to said windings for applying energizing pulses thereto, the sense of said windings positioned through said openings being such that one of said windings at each location is effective when energized to apply magnetomotive force in a first direction to the flux path which it embraces and each of the remainder of said windings at each location is effective when energized to apply magnetomotive force in a second direction to the flux path which it embraces, and output winding means embracing at least one of said flux paths.

25. In a magnetic core logical circuit, a core of magnetic material, said core having first, second and third openings positioned therethrough, first, second and third input winding means, each of said input winding means including windings positioned through each of said openings to embrace a portion of material at the location of each opening, means inductively associated with said core for initially establishing a condition of unidirectional flux remanence in said core, means for applying input signals to said windings, the sense of the windings of each of said winding means being such that each winding means is effective when energized exclusively to cause a flux reversal in a portion of the material around one of said openings, and output winding means inductively associated with said core.

26. In a magnetic core logical circuit, a core of magnetic material having a plurality of openings positioned therethrough at different locations, said openings dividing said core into first and second parallel flux paths, a plurality of input windings each positioned through at least one of said plurality of openings, each of said windings being positioned to embrace only one of said flux paths at the location of the opening through which it is positioned and all of said windings being positioned to embrace the same one of said flux paths at the location of the same opening, means coupled to one of said windings positioned through a first one of said openings at a first one of said locations for applying clock pulses to said winding, means coupled to the remainder of said windings for applying information input pulses thereto, the sense of said windings being such that all of said input windings but said one winding at said first location and one of said windings at each of the other of said locations are effective when energized to apply at their respective locations magnetomotive force in a first direction, said one winding at said first location and the remainder of the windings at said other locations being effective when energized to apply at the respective locations magnetomotive force in a second direction.

27. In a logical circuit, a magnetic core having at first and second locations thereof first and second openings dividing the core into first and second flux paths; a plurality of input winding means positioned through said openings, each embracing one of said flux paths at the location of each opening through which it is positioned; the sense of said input winding means with respect to each other and to said flux paths embraced being different at different ones of said openings and output winding means inductively associated with said core for manifesting outputs in response to predetermined logical combinations of inputs applied to said input winding means.

28. The circuit of claim 27 wherein there is also provided a bias winding positioned through at least one but not all of said openings; and pulse means coupled to said bias winding for applying clock pulses thereto.

29. A magnetic core circuit comprising a core of a magnetic material capable of assuming first and second remanent states of flux orientation, said core having at first and second locations, respectively, first and second openings therethrough dividing the core into first and second parallel flux paths, first and second input windings each positioned through said first opening so that each embraces only one of said first and second flux paths, third and fourth input windings each positioned through said second opening so that each embraces only one of said first and second flux paths, said first and third input windings embracing said first flux path only, and said second and fourth input windings embracing said second flux path only, a plurality of signal sources for applying energizing signals to said input windings, said first and second input windings being connected to different ones of said signal sources and said third and fourth input windings being connected to different ones of said signal sources so that when any one of said sources is actuated exclusively only one input winding embracing only one of the flux paths at any of said first and second locations is energized, and output winding means inductively associated with said core.

References Cited in the file of this patent

UNITED STATES PATENTS

| | | |
|---|---|---|
| 2,519,426 | Grant | Aug. 22, 1950 |
| 2,803,812 | Rajchman | Aug. 20, 1957 |
| 2,810,901 | Crane | Oct. 22, 1957 |
| 2,814,794 | Bauer | Nov. 26, 1957 |
| 2,818,555 | Lo | Dec. 31, 1957 |
| 2,855,586 | Brown | Oct. 7, 1958 |
| 2,919,430 | Rajchman | Dec. 29, 1959 |

FOREIGN PATENTS

| | | |
|---|---|---|
| 881,089 | Germany | June 25, 1953 |

OTHER REFERENCES

"Proceedings of the IRE," vol. 44, No. 3, March 1956, pp. 321–332.

"1955 Western Joint Computer Conference," March 1955, pp. 111–116.

"Electrical Design," vol. 3, August 1955, pp. 24–27.